Figure 2A:
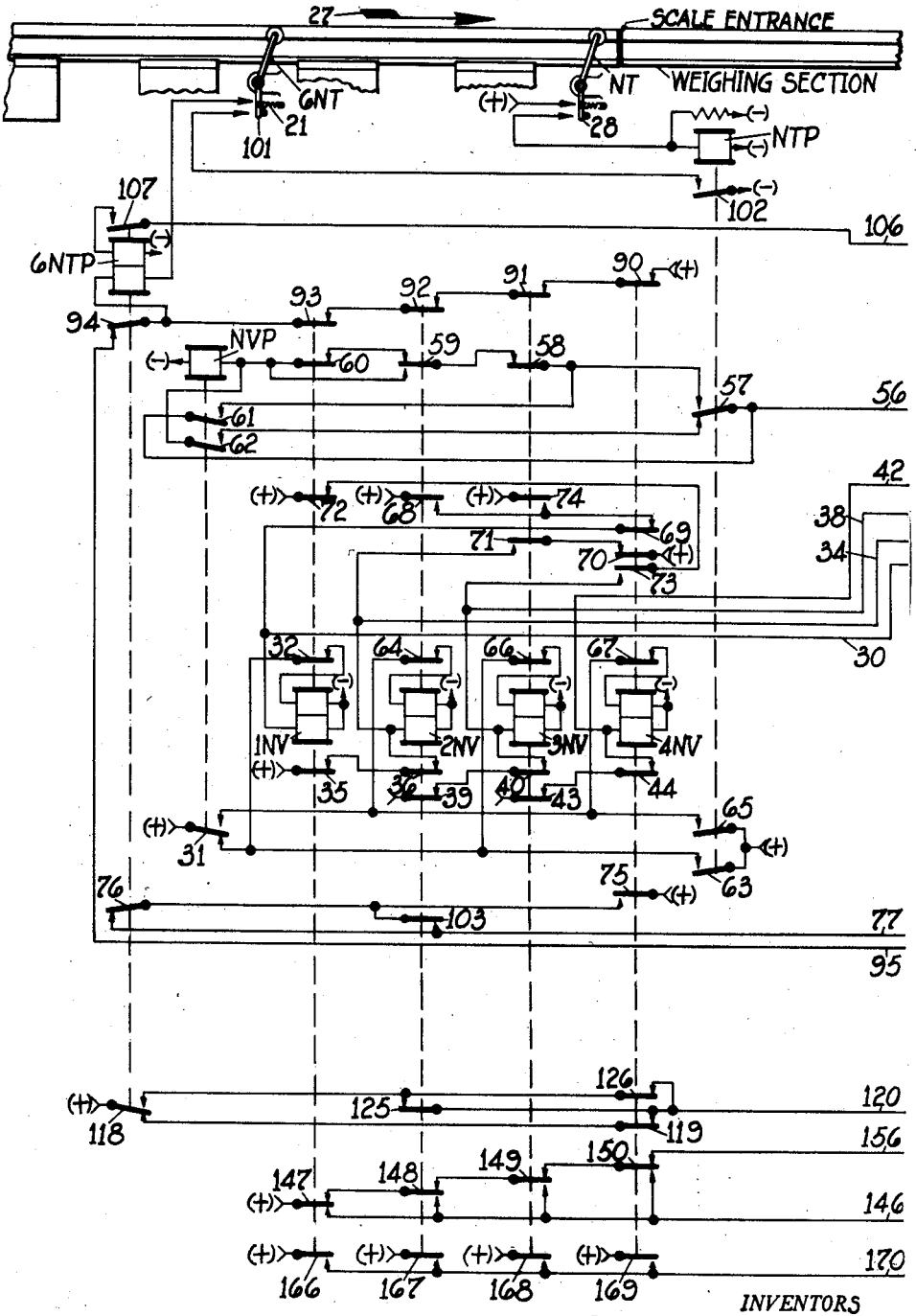

Sept. 17, 1957  G. VANDE SANDE ET AL  2,806,685
WEIGHT RECORDING SYSTEM FOR MOVING RAILWAY CARS
Filed April 18, 1952  4 Sheets-Sheet 1

Fig.3.
CAR COUNTER SEQUENCE

| COUNT | RELAY 1A-5 | RELAY 2A-5 |
|---|---|---|
| 0 | DOWN | DOWN |
| 1 | UP | DOWN |
| 2 | DOWN | UP |
| 3 | UP | UP |
| 4 | DOWN | DOWN |

INVENTORS
G. Vande Sande and H.S. Wynn
BY
Neil W. Preston
Their ATTORNEY

United States Patent Office 2,806,685
Patented Sept. 17, 1957

2,806,685

WEIGHT RECORDING SYSTEM FOR MOVING RAILWAY CARS

George Vande Sande, Greece, and Harold S. Wynn, Pittsford, N. Y., assignors to General Railway Signal Company, Rochester, N. Y.

Application April 18, 1952, Serial No. 283,102

16 Claims. (Cl. 265—5)

This invention relates to weight recording systems for moving railway cars, and it more particularly pertains to a system for permitting the recording of the weight of each car only provided the car is fully and solely on the weighing section, or scales, for a predetermined interval of time.

The present invention is of particular utility in a hump classification yard, where the weighing section is located a short distance off of the crest of the hump, and weighing of moving cars is to be accomplished while the cars are being classified. Under these conditions, the weighing must be accomplished as quickly as possible in order not to limit the rate of car classification. On the other hand, it is required that a car remain fully and solely on the weighing rails of the scales for a predetermined time interval before recording of the weight in order to permit accurate weighing by the weighing mechanism. Thus accurate timing is desired, with the timing initiated the instant a car is fully and solely on the weighing section. However, the timing must be interrupted or the recording of the weight prevented, as soon as this condition of being fully and solely on the weighing section is changed.

Generally speaking, the present invention contemplates an organization having respective entrance and exit axle counters for counting cars into and out of the weighing section, and a car counter for registering the number of cars that are fully in the weighing section or have one or more axles included in the weighing section when leaving.

Inasmuch as the cars passing through the weighing section can be either four or six axle cars, the respective entrance and exit counters must take this into consideration in counting axles to determine when the cars are fully in or fully out of the weighing section. The detection as to whether an entering or a leaving car is a four or six axle car is determined by a detector system requiring simultaneous actuation of treadles by the front and rear axles of the first truck for the detection of a six axle car. The spacing of treadles is such that axles of a two axle truck will not actuate the treadles simultaneously.

A weighing stabilization time interval is measured by a timing device, the timing being initiated whenever the car counter registers a count of one, provided that there is no count registered in either of the entrance or exit axle counters. At the end of the interval, the weight is recorded, but if either the entrance or the exit axle counter should register a count before termination of the time interval, the timer is restored, and it must be reinitiated when the condition for initiation is again fulfilled.

An object of the present invention is to provide a system for automatically recording the weight of successive moving cars individually, wherein a maximum rate of movement of cars through the weighing section can be obtained.

Another object of the present invention is to detect the class of cars being weighed as four or six axle cars in order to detect by axle counting when a car of either class is fully in or fully out of the weighing section.

Another object of the present invention is to continuously register in a car counter the number of cars fully in the weighing section and including any car having one or more axles on the weighing rails that may be leaving the weighing section.

Another object of the present invention is to provide entrance and exit axle counters for the respective entrance and exit ends of the weighing section capable of counting four or six axles as selected by associated four or six axle car detectors.

Another object of the present invention is to feed respective add and subtract car counts to the car counter from the respective entrance and exit axle counters.

Another object of the present invention is to provide an interlock to prevent add and subtract counts from being fed into the car counter simultaneously.

Another object of the present invention is to provide timing means for measuring weight stabilization time intervals, subject to initiation by the car counter, and subject to interruption for its complete operation in case another car enters, or a car starts to leave the weighing section prior to the completion of a predetermined timing interval.

Figure 2B:
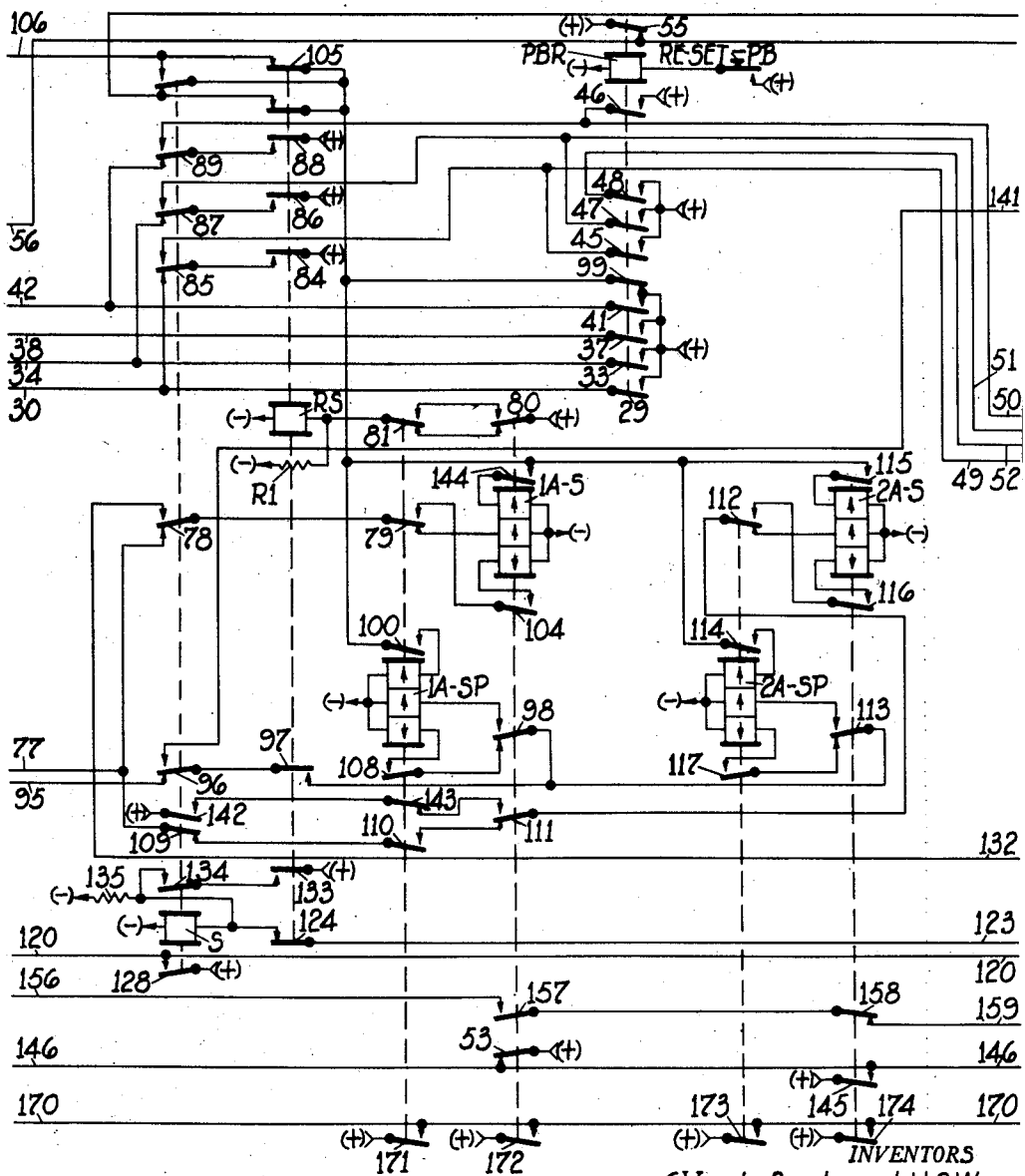

The feature herein disclosed, which relates to a relay binary counter of the add and subtract type as used in Fig. 2B of this application, is disclosed and claimed in the sole continuation-in-part application of G. Vande Sande, Ser. No. 333,758, filed January 28, 1953.

Figure 2C:
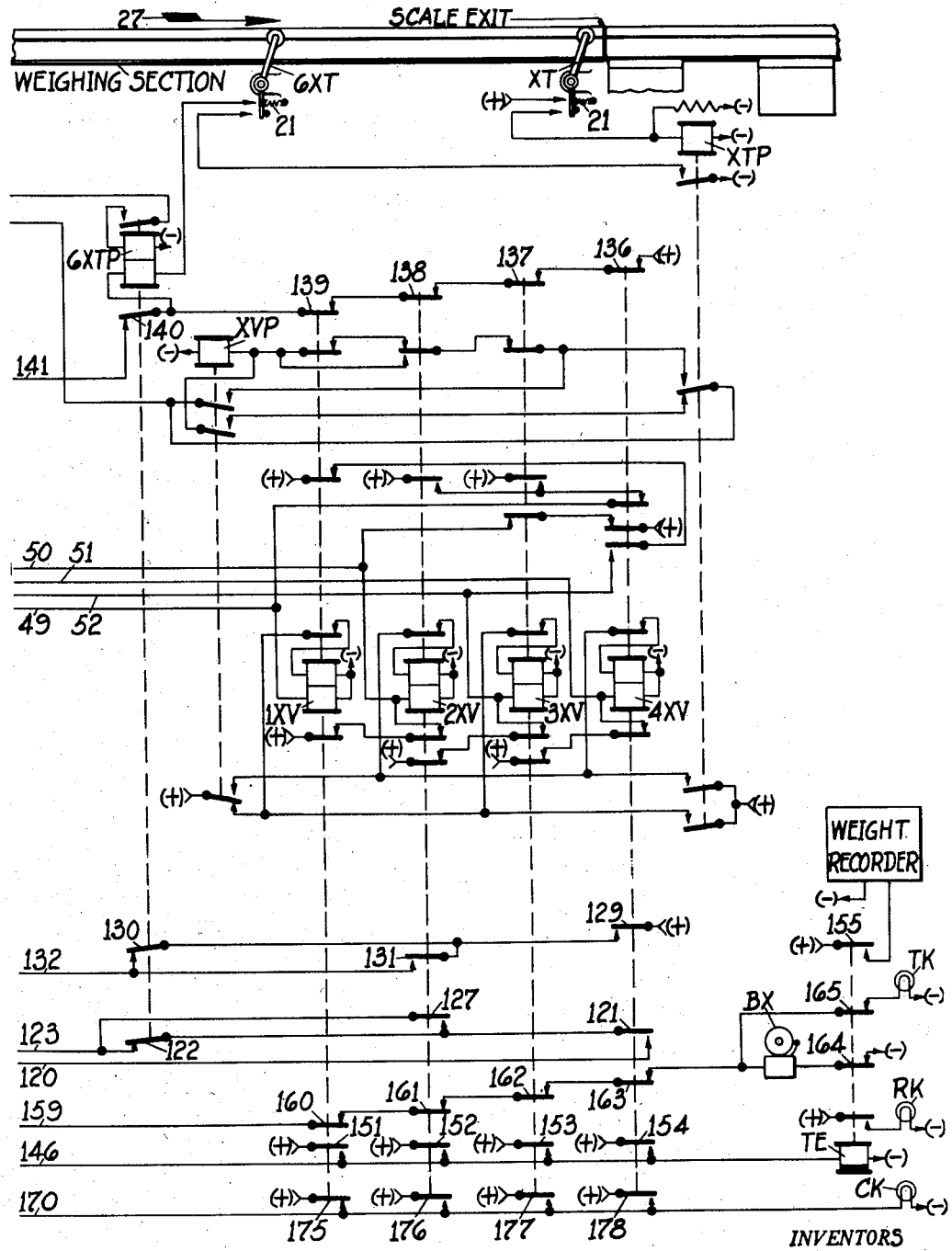

Also, the feature herein disclosed, which relates to a stepping relay bank of the normally energized repeat type employing a half-step relay as disclosed in Figs. 2A and 2C of this application, is disclosed and claimed in the sole continuation-in-part application of G. Vande Sande, Ser. No. 333,757, filed January 28, 1953.

Other objects, purposes, and characteristic features of the present invention will be in part obvious from the accompanying drawings, and in part pointed out as the description of the invention progresses.

In describing the invention in detail, reference is made to the accompanying drawings, wherein like letter reference characters are used to identify parts of a similar nature which are generally made distinctive by preceding numerals which may be indicative of the order of operation or of whether the particular device is used in the counting of the axles of four or six axle cars; and in which:

Fig. 1 illustrates in somewhat of a diagrammatic manner the general organization of a system for governing the recording of car weights;

Figs. 2A, 2B, and 2C, when placed side by side respectively illustrate a specific circuit organization for governing the recording of car weights; and Fig. 3 is a car count sequence chart showing the positions of the car counter relays that are assumed for various counts.

Conventional schematic illustrations have been employed in the drawings to more particularly facilitate the disclosure of the system as to its general organization and mode of operation, rather than to show the specific construction and arrangement of parts that may be provided by those skilled in the art in their practice of the invention. The symbols (+) and (—) have been used to designate connection of the respective positive and negative terminals of suitable batteries or other sources of direct current.

With reference to Fig. 1, the general organization of the system is illustrated as comprising a weighing section of track 20, a weighing mechanism actuated by the weight of cars when in the weighing section 20, an entrance axle counter, an exit axle counter, a car counter for receiving respective add and subtract car counts from the respective entrance and exit axle counters, a weighing interval timer and a weight recorder.

Although the system is to be considered applicable to any railway car weighing problem involving the weighing of moving cars, for the present embodiment of the invention, it will be assumed that the weighing section 20 is disposed just off the hump of a classification yard, with the direction of traffic being from left to right as is indicated by the direction arrow 27. With the weighing section so disposed in a classification yard, the cars to be weighed are uncoupled one at a time from the train of cars being pushed over the hump, and the cars then roll free through the weighing section.

Although different forms may be used for providing an input to the respective entrance and exit axle counters, for this embodiment of the present invention, treadle operated contacts are actuated by the flanges of the car wheels. Thus treadles NT and 6NT are so constructed and disposed along the trackway at the entrance to the weighing section 20 as to be actuated by the flanges of the car wheels and to be self restored as by springs 21, the contacts of these treadles being normally open, and being closed momentarily upon the passage of respective wheels. The treadle NT is located substantially at the entrance to the weighing section 20 so that each car wheel which actuates the treadle NT is counted into the weighing section 20 substantially simultaneous with its entry into the section.

The treadle 6NT is located a distance toward the crest of the hump from the treadle NT substantially equal to the spacing of the front and rear axles of a three axle car truck. This is so that the treadles NT and 6NT are simultaneously actuated upon the passage of a three axle truck of a six axle car, but not simultaneously actuated by the respective axles of a two axle truck of a four axle car.

A direct repeater relay NTP is provided for repeating the contact 28 of the treadle NT, and a relay 6NTP is provided for repeating the simultaneous actuation of the treadles NT and 6NT under certain operating conditions to be hereinafter considered.

An organization for the actuation of the exit axle counter is provided similar to that which has been described as associated with the entrance to the weighing section 20. Thus treadles XT and 6XT are provided for actuation of contacts governing the exit axle counter, these treadles being actually disposed in the weighing section 20, as compared to the treadles NT and 6NT that are disposed in approach to the weighing section 20. It is preferable that the treadle XT be located so as to be actuated by a wheel just prior to its leaving the weighing section 20, while the treadle 6XT is disposed a distance in approach to the treadle XT equal to the spacing of the front and rear axles of a three axle truck.

Although different types of axle counters may be employed in accordance with the requirements of practice, the entrance axle counter illustrated in Fig. 2A is shown as comprising normally energized neutral relays 1NV, 2NV, 3NV, and 4NV, and a half step relay NVP.

Similarly, the exit axle counter is illustrated in Fig. 2C as comprising normally energized neutral stepping relays 1XV, 2XV, 3XV, and 4XV, and a half step relay XVP.

The car counter comprises a binary organization of relays as shown in Fig. 2B wherein the neutral relays 1A–S and 1A–SP are provided as a first stage of a binary counter, and the relays 2A–S and 2A–SP are provided as a second stage of the car counter.

With reference to Fig. 2B, a restoration relay RS is provided for governing the restoration of the respective entrance and exit axle counters when such counters have respectively fed their count into the car counter.

A manual re-set is provided in the form of a re-set push button PB of Fig. 2B, such push button having a repeater relay PBR for actually applying restoration energy to the respective counting relays.

With reference to Fig. 2B, a relay S is provided for feeding respective subtract counts into the car counter, this relay being provided primarily for the purpose of causing counts to be registered in turn in the car counter when cars are counted in and out of the weighing section 20 simultaneously.

An interval timer is provided in the form of the slow drop away relay TE of Fig. 2C, and a suitable audible signal device BX is provided for indicating when the timer TE is in operation.

Indicator lamps TK, CK, and RK are provided as shown in Fig. 2C for indicating respectively when timing is taking place, when a count is set up in any of the counters, and when the weight recorder is actuated.

Having thus considered the general organization of the apparatus for a particular embodiment of the present invention, consideration will now be given more specifically to the circuit organization when considering various typical conditions of operation.

OPERATION

Normal conditions

The normal conditions of the system are to be understood as being those conditions wherein there is no count registered in any of the counters, but the power is applied to the system and the system is in condition for counting operations. Thus, under normal conditions, the axle counter relays V are in their energized positions; the timing relay TE is also normally energized as it is the deenergization of this relay that initiates the timing; and all other relays are in their deenergized positions.

To set up the normal conditions of the system initially upon the application of power to the system, it is necessary to actuate the re-set push button PB (see Fig. 2B). The actuation of this push button PB causes the picking up of the re-set relay PBR in an obvious manner, and the picking up of this relay applies pickup energy to all of the axle counter relays V. Thus with relay PBR picked up, energy can be applied to the relay 1NV to cause the picking up of that relay through front contact 29 of relay PBR, wire 30, and lower winding of relay 1NV. When picked up, a stick circuit is closed for this relay through back contact 31 of relay NVP, front contact 32, and upper winding of relay 1NV.

Relay 2NV can be picked up in response to the picking up of relay PBR by a circuit including front contact 33 of relay PBR, wire 34, and lower winding of relay 2NV. This relay when picked up is maintained normally energized by a stick circuit including front contact 35 of relay 1NV, front contact 36 of relay 2NV, and lower winding of relay 2NV.

Relay 3NV can be picked up in response to the picking up of relay PBR by a circuit including front contact 37 of relay PBR, wire 38, and lower winding of relay 3NV. The picking up of this relay establishes a stick circuit to maintain it normally energized including front contact 39 of relay 2NV, front contact 40 of relay 3NV, and lower winding of relay 3NV.

Relay 4NV can be picked up upon the picking up of relay PBR by a circuit extending through front contact 41 of relay PBR, wire 42, and lower winding of relay 4NV. This relay when picked up is maintained energized during normal conditions of the system by a stick circuit including front contact 43 of relay 3NV, front contact 44 of relay 4NV, and lower winding of relay 4NV.

The circuits for the control of the exit axle counter relays XV are comparable to those circuits which have been provided for the entrance axle counters NV, and thus it is believed unnecessary to describe specifically the circuit organizations of these exit counter relays. The exit counter relays XV are respectively picked up upon actuation of the re-set push button PB by energy applied through front contacts 45, 46, 47, and 48 of the relay PBR through the wires 49, 50, 51, and 52 to the lower windings of the relays 1XV, 2XV, 4XV, and 3XV, respectively.

The timer relay TE becomes energized upon application of power to the system by reason of their being no count registered by the car counter. Thus the relay TE is normally energized through back contact 53 of relay 1A-S (see Fig. 2B).

*Axle counting*

To consider the mode of operation during axle counting by the entrance axle counter, it will be assumed that a car enters the weighing section 20 and thus successively actuates the entrance treadle NT (see Fig. 2A). The treadle 6NT is also actuated, but for purposes of initial consideration of the mode of operation, it will be assumed that the car entering the weighing section 20 is a four axle car, and in this case, the actuation of the treadle 6NT is ineffective in causing any relay operation.

In accordance with the first actuation of the treadle NT, the closure of its contact 28 causes the picking up of the repeater relay NTP, and the picking up of this repeater relay closes a circuit to cause the picking up of the half step relay NVP. The circuit for the energization of relay NVP extends from (+), including back contact 55 of relay PBR (see Fig. 2B), wire 56, front contact 57 of relay NTP, front contact 58 of relay 3NV, front contact 59 of relay 2NV, front contact 60 of relay 1NV, and winding of relay NVP, to (—). This relay, when picked up, is maintained energized by stick energy shunting contact 57 of relay NTP with front contact 61 of relay NTP. Upon the dropping away of the relay NTP, the shifting of contact 57 establishes a stick circuit through front contact 62 for relay NVP which shunts the contacts of the stepping relays NV out of the circuit for this relay so as to maintain the relay NVP energized until the relay NTP is again actuated in response to a second axle operating the treadle NT.

Upon the picking up of relay NTP for the first count, energy is applied to the upper winding of relay 1NV through front contact 63 of relay NTP, and front contact 32 of relay 1NV, so as to maintain relay 1NV picked up subsequent to the shifting of contact 31 of relay NVP and until the restoration of the treadle NT and its repeater relay NTP as the first axle of the car leaves the treadle NT and enters the weighing section 20.

Thus the first step is taken upon the dropping away of relay NTP after actuation by the first axle, and the dropping away of relay 1NV at this time opens the normally energized circuit for the relay 2NV so that the relay 2NV is held up only by energy through front contact 31 of relay NVP and front contact 64 of relay 2NV in order to condition the relay 2NV so that it can be dropped away in accordance with the dropping away of the relay NTP at the end of the second count.

When the relay NTP is picked up for the second count, one stick circuit for the half step relay NVP is open at back contact 57, and the other stick circuit is open at front contact 60 of relay 1NV because of the first step having been taken. Relay 2NV is maintained energized subsequent to the opening of front contact 31 of relay NVP through front contact 65 of relay NTP so that the second step is not taken until the relay NTP has been dropped away upon passage of the second axle off of the treadle NT. Thus when the relay NTP is dropped away for the second count, relay 2NV is dropped away upon the opening of its circuit at front contact 65.

Upon the picking up of relay NTP in response to the actuation of treadle NT by the third axle, the half step relay NVP is again picked up because of a pickup circuit conditioned by the dropping away of relay 2NV. This pickup circuit for relay NVP extends from (+), including back contact 55 of relay PBR (see Fig. 2B), wire 56, front contact 57 of relay NTP, front contact 58 of relay 3NV, back contact 59 of relay 2NV, and winding of relay NVP, to (—). Stick energy is provided by the closure of front contact 61 to shunt contact 57 out of the circuit just described, and upon the closure of back contact 57, a stick circuit is established through front contact 62 to shunt the counting relay contacts out of the circuit for relay NVP, thus providing that relay NVP will be maintained picked up until the next time that the relay NTP is picked up.

When the second count is registered by the dropping away of the relay 2NV, the circuit by which the relay 3NV is normally energized is opened at front contact 39, but the relay 3NV is maintained energized through back contact 31 of relay NVP and front contact 66 of relay 3NV until the relay NVP is picked up as has been described in response to the third actuation of the relay NTP. However, prior to the dropping away of relay NVP, the closure of front contact 63 of relay NTP applies energy through front contact 66 of relay 3NV and through upper winding of relay 3NV to maintain that relay energized until the relay NTP is dropped away for the third time. Thus the dropping away of relay NTP upon the passage of the third axle into the weighing section 20, by the opening of front contact 63, causes the count of the third axle to be registered by the dropping away of the relay 3NV.

Relay 3NV in dropping away opens the normally energized circuit for relay 4NV at front contact 43, but the relay 4NV has energy applied at this time to its upper winding through front contact 31 of relay NVP, and front contact 67 of relay 4NV. Upon the picking up of relay NTP in response to the actuation of the treadle NT by the fourth axle, the closure of front contact 65 applies energy through front contact 67 of relay 4NV to the upper winding of that relay to maintain it picked up subsequent to the opening of front contact 31 upon the dropping away of the half step relay NVP. Relay NVP becomes dropped away upon the picking up of relay NTP for the fourth time because of the opening of back contact 57 in one stick circuit, the other stick circuit having been opened at front contact 58 by the dropping away of relay 3NV. Thus with the relay 3NV dropped away, the energization of relay 4NV is made entirely dependent upon front contact 65 of relay NTP so that the entrance of the last axle of the four axle car into the weighing section 20 causes the picking up of the relay 4NV for the fourth count in accordance with the dropping away of the relay NTP.

Inasmuch as the axle counter is required at times to count six axles, the bank of four counting relays constituting the axle counter are so arranged that there is a partial repeat of the stepping operation in order to obtain the additional counts. It is therefore provided that the relay 1NV is again picked up so as to be used for the fifth count, relay 2NV is again picked up so it can be used for the sixth count and relay 3NV is picked up for reasons involved in the control of the half step NVP, and to form a seventh step, although no seventh count is required.

Thus relay 1NV is picked up during the counting operation upon the dropping away of the relay 2NV for the second count. The pickup circuit for relay 1NV under these conditions extends from (+) including back contact 68 of relay 2NV, front contact 69 of relay 4NV, and lower winding of relay 1NV, to (—). Relay 2NV is picked up upon the dropping away of relay 3NV by the energization of a circuit extending from (+) including front contact 70 of relay 4NV, back contact 71 of relay 3NV, and lower winding of relay 2NV, to (—). Relay 3NV is picked up upon the dropping away of relay 4NV by the energization of a circuit extending from (+) including front contact 72 of relay 1NV, back contact 73 of relay 4NV, and lower winding of relay 3NV, to (—). It will be noted that the inclusion of back contact 74 of relay 3NV in multiple with back contact 68 of relay 2NV provides that the relay 1NV is maintained picked up after the picking up of relay 2NV according to the above described mode of operation. The counting relays have thus been re-energized except for the relay 4NV which remains in its dropped away position while the additional counts 5 and 6 are taken when counting the axles of a six axle car.

When the fifth axle of a six axle car actuates the treadle NT, the closure of front contact 57 of relay NTP causes the picking up of the half step relay NVP through front contacts 58, 59, and 60 of realys 3NV, 2NV, and 1NV, respectively. Stick circuits for relay NVP are provided as has been described so that this relay is maintained picked up until the relay NTP is picked up in response to actuation of treadle NT by the sixth axle. With relay NVP picked up, the circuit for the upper winding of relay 1NV is open at back contact 31, but the relay 1NV is maintained picked up by a circuit extending through front contact 63 of relay NTP, the pickup circuit for relay 1NV through front contact 69 of relay 4NV having been opened when the fourth count was taken. Thus the fifth count is made when the relay NTP is dropped away subsequent to passage of the fifth axle over the treadle NT.

The actuation of the treadle NT by the sixth axle is effective in causing the picking up of relay NTP to deenergize the half step relay NVP upon the opening of back contact 57 because the front contact 59 of relay 2NV is closed and the front contact 60 of relay 1NV is open. Relay NVP in dropping away under these conditions, by the opening of front contact 31 conditions the relay 2NV so that its energization is solely dependent upon the front contact 65 of relay NTP and therefore will be dropped away upon the dropping away of the relay NTP for the sixth time to count the sixth axle.

Having thus described how the axles of four and six axle cars can be counted by the entrance axle counter, it is to be understood that a corresponding mode of operation is effective for the exit axle counter in counting axles leaving the weighing section 20. The manner in which the respective four and six axle counting causes respective car counts to be fed into the car counter will be hereinafter considered.

*Counting cars in*

As has been pointed out, the actuation of the entrance treadle NT by the first axle of a car, without the actuation of the treadle 6NT at the same time determines that the count about to be taken is of axles of a four axle car, and thus the six axle entrance treadle repeater relay 6NTP will remain in its dropped away position for the counting of the axles of that car. In other words, this determines that only a count of four by the entrance axle counter will be required in order to provide an input for the car counter. This count of four is obtained upon the dropping away of the relay 4NV, and thus (assuming normal conditions of the car counter) the relay 1A–S (see Fig. 2B) is picked up in response to the dropping away of relay 4NV to count one car as being full on the weighing section 20. The circuit for the energization of relay 1A–S extends from (+), including back contact 75 of relay 4NV, back contact 76 of relay 6NTP, wire 77, back contact 78 of relay S, back contact 79 of relay 1A–SP, and center winding of relay 1A–S to (—). Relay 1A–S is maintained picked up by a stick circuit for its upper winding, including front contact 144 of relay 1A–S and back contact 99 of relay PBR.

Having thus registered a car count in the car counter by the picking up of relay 1A–S (assuming no other car counters to have been stored in the car counter) the entrance axle counter can now be reset so as to be in condition to count the axles of the next following car. This is accomplished in accordance with the dropping away of the reset relay RS which is normally energized through the back contacts 80 and 81 of relays 1A–S and 1A–SP, respectively. It will be seen from this circuit that the relay RS is deenergized when the relays 1A–S and 1A–SP are out of correspondence with each other. This is the condition that exists when either an add or a subtract count is fed into the car counter, prior to the resetting of the particular axle couner by which the car counter has been actuated. Thus the relay RS is dropped away upon the picking up of relay 1A–S, and the dropping away of this relay provides reset energy to the respective relays of the entrance axle counter to restore these relays to their normally energized conditions.

The dropping away of relay RS provides for the energization of relay 1NV through back contact 84 of relay RS, back contact 85 of relay S, and wire 30. If it is a four axle car that has entered the weighing section, the relay 1NV is already picked up, but the reset circuit just described is required where a six axle car has been counted into the weighing section 20. Similarly the relay 2NV has energy applied to its lower winding through back contact 86 of relay RS, back contact 87 of relay S, and wire 34. This reset circuit is required only where six axle cars are counted into the weighing section 20. Relay 3NV is in its picked up condition at the end of either a four or a six axle count, and therefore no resetting of this relay is required for either a six or a four axle count. Relay 4NV has energy applied to its lower winding for reset through back contact 88 of relay RS, back contact 89 of relay S, and wire 42.

When reset of the entrance axle counter has been accomplished, the relay 1A–SP of the car counter is picked up. The pickup circuit for this relay extends from (+), including front contacts 90, 91, 92, and 93 of relays 4NV, 3NV, 2NV, and 1NV, respectively, back contact 94 of relay 6NTP, wire 95, back contact 96 of relay S, back contact 97 of relay RS, front contact 98 of relay 1A–S, and center winding of relay 1A–SP, to (—). Upon the picking up of relay 1A–SP, a pickup circuit is closed for the reset relay RS including the front contacts 80 and 81 of relays 1A–S, and 1A–SP, respectively. Upon the picking up of relay RS, the reset circuits for the entrance axle counter relays that have been described are opened and the entrance axle counter is in condition to start counting the axles of the next car. The picking up of relay RS opens the circuit just described for the relay 1A–SP at back contact 97, but relay 1A–SP does not drop away as its upper winding is energized by a stick circuit extending from (+), including back contact 99 of relay PBR, front contact 100 of relay 1A–SP, and upper winding of relay 1A–SP, to (—). This relay 1A–SP is maintained energized particularly for the purpose of selecting by its front contact 79 that the next time an add count is fed into the first stage of the car counter, the relay 1A–S will be energized through its lower winding with a polarity to cause the relay 1A–S to be driven to its dropped away position. Thus it will be seen that the relay 1A–SP is actuated subsequent to each operation of the relay 1A–S, and such actuation selects the control of the relay 1A–S so that it will be operated to its opposite position for the next count to be fed into the car counter.

Having thus considered the registration of the count of a four axle car in the car counter, consideration will now be given as to the circuit organization for registering a count in the car counter for a six axle car.

When the first axle of the six axle car actuates the treadle NT, the treadle 6NT is simultaneously actuated for the third axle of the car, and in accordance with this simultaneous operation, the relay 6NTP is picked up by the energization of a circuit extending from (+), including front contacts 90, 91, 92, and 93 of relays 4NV, 3NV, 2NV, and 1NV, respectively, lower winding of relay 6NTP, contact 101 of treadle 6NT, and front contact 102 of relay NTP, to (—). Relay 6NTP when picked up is maintained energized until the count of the axles of the six axle car is completed and car count has been fed into the car counter by reason of a stick circuit extending from (+), including back counter 99 of relay PBR, front contact 105 of relay RS, wire 106, front contact 107 of relay 6NTP and upper winding of relay 6NTP, to (—). Relay 6NTP when picked up opens the circuit at back contact 76 by which a car count is fed from the entrance counter to the car counter for a four axle car, and thus it is required that the counting continue until six axles have been counted before a circuit can be closed for feeding a car count into the car counter. The sixth count is made by the dropping away of relay 2NV during the partial repeat of the operation of the counting relays as has been described, and in accordance with the back contacts 75 and 103 of relays 4NV and 2NV being both closed, a circuit is closed feeding to the first stage of the car counter. For purpose of illustration of the mode of operation of the car counter, it will be assumed that there has been a previous car count register as has been described, and thus the relays 1A-S and 1A-SP are in their picked up positions. Energy of a polarity to drive the relay 1A-S down is provided through back contact 75 of relay 4NV, back contact 103 of relay 2NV, wire 77, back contact 78 and relay S, front contact 79 of relay 1A-SP, front contact 104 of relay 1A-S, and lower winding of relay 1A-S. The neutralization of the flux in the relay 1A-S causes it to be dropped away, and the dropping away of this relay opens the circuit that has just been described at front contact 104.

In accordance with the dropping away of relay 1A-S under the above described conditions, the reset relay RS is deenergized because of its circuit being open at front contact 80 of relay 1A-S, but relay RS is slow to drop away because of being shunted by the resistor R1.

The dropping away of relay 1A-S, with relay 1A-SP picked up, causes the picking up of relay 2A-S of the second stage of the car counter. The circuit by which relay 2A-S is picked up extends from (+), including back contact 75 of relay 4NV (see Fig. 2A), back contact 103 of relay 2NV, wire 77, back contact 109 of relay S, front contact 110 of relay 1A-SP, back contact 111 of relay 1A-S, back contact 112 of relay 2A-SP, and center winding of relay 2A-S, to (—).

After relay RS has become dropped away, the relay 6NTP is dropped away by the opening of its circuit at front contact 105 of relay RS, and the entrance counter relays NV are reset to their picked up positions according to a mode of operation which has been heretofor described. It will be noted that the resetting of the relay 3NV is not required because this relay is not dropped away during the final stage of the counting of the car axles.

In accordance with the entrance axle counter relays NV having been reset, the relays 1A-SP and 2A-SP of the car counter become energized, the relay 1A-SP being energized with a polarity to cause it to be actuated to its dropped away position by reason of neutralization of the flux in the relay, and the relay 2A-SP being actuated to its picked up position in correspondence with the position of its associated relay 2A-S. The circuit for the energization of relay 1A-SP extends from (+), including front contacts 90, 91, 92, and 93 of relays 4NV, 3NV, 2NV, and 1NV, respectively, back contact 94 of relay 6NTP, wire 95, back contact 96 of relay S, back contact 97 of relay RS, back contact 98 of relay 1A-S, front contact 108 of relay 1A-SP, and lower winding of relay 1A-SP, to (—). The energization of this circuit causes the relay 1A-SP to be dropped away, and the dropping away of this relay opens its oppositely poled stick circuits at front contacts 100 and 108 respectively. The circuit by which the relay 2A-SP is picked up extends from (+), including back contacts 90, 91, 92, and 93 of relays 4NV, 3NV, 2NV, and 1NV, respectively, back contact 94 of relay 6NTP, wire 95, back contact 96 of relay S, back contact 97 of relay RS, front contact 113 of relay 2A-S, and center winding of relay 2A-SP, to (—). This relay when picked up is maintained energized by a stick circuit extending from (+), including back contact 99 of relay PBR, front contact 114 of relay 2A-SP, and upper winding of relay 2A-SP, to (—). This stick circuit also applies energy through front contact 115 to the upper winding of relay 2A-S. In accordance with the dropping away of the relay 1A-SP, a pickup circuit is closed for the reset relay RS through back contacts 80 and 81 of relays 1A-S and 1A-SP respectively to cause relay RS to be picked up and thus remove reset energy from the entrance axle counter relays and to open the pickup circuit just described for the relay 2A-SP at back contact 97. This completes the setting up of the count for the second car by the car counter and the resetting of the axle counter responsible for feeding the second count into the car counter.

To consider further operation of the car counter, it may be assumed that the axles are counted complete for the entrance of a third car into the weighing section 20, and under these conditions the third count calls for the picking up of the relay 1A-S in the same manner as did the first car count, the energization of the relay 1A-S being either in accordance with the closure of back contact 76 of relay 6NTP in combination with back contact 75 of relay 4NV, in case of a four axle car, or in accordance with the closure of back contacts 103 and 75 of relays 2NV and 4NV respectively for a six axle car. The mode of operation of the relay RS in causing the resetting of the entrance counter and the picking up of the relay 1A-SP for the third count, is the same as that which has been specifically described in connection with the count of the first car.

It is of course dependent upon the length of the weighing section 20 as to how many cars can be included at one time in the count of the car counter. The car counter illustrated in Fig. 2B can be used for counting four cars, although in all probability the length of the weighing section 20 would be such that only three cars could be in the weighing section at one time. If a fourth car should fully enter the weighing section 20, however, before the first of three cars already counted into the weighing section 20 has been counted out, the fourth count would cause the dropping away of all of the relays of the car counter. In other words, the effect of the fourth count would be to restore all of the car counter relays to their normal conditions, corresponding to a zero count as well as to the count of four under the conditions which are presently assumed.

For adding a fourth count into the car counter, the mode of operation of the relay 1A-S in being dropped away, and the dropping away of relay RS, is the same as that which has been described for the count of two cars. Upon the dropping away of relay 1A-S, energy of a polarity to neutralize the flux in relay 2A-S is applied by a circuit extending from (+), including back contact 75 of relay 4NV (see Fig. 2A), back contact 103 of relay 2NV or back contact 76 of relay 6NTP (dependent upon whether it is a four or a six axle car that has entered weighing section 20), wire 77, back contact 109 of relay S, front contact 110 of relay 1A-SP, back contact 111 of relay 1A-S, front contact 112 of relay 2A-SP, front contact 116 of relay 2A-S, and lower winding of relay 2A-S, to (—). Because of the neutralization of the flux in the relay 2A-S, this relay becomes dropped away, and in dropping away opens the circuits for its upper and lower windings at front contacts 115 and 116, respectively.

After the reset relay RS has been effective to cause the resetting of the entrance axle counter relays, a circuit which has been described is closed to cause the driving down of the relay 1A-SP, and at the same time, a circuit is closed for the driving down of relay 2A-SP extending from (+), including front contacts 90, 91, 92, and 93 of relay 4NV, 3NV, 2NV, and 1NV (see Fig. 2A) respectively, back contact 94 of relay 6NTP, wire 95, back contact 96 of relay S, back contact 97 of relay RS, back contact 113 of relay 2A-S, front contact 117 of relay 2A-SP, and lower winding of relay 2A-SP, to (—). The relay RS is again picked up in accordance with the relays 1A–S, and 1A–SP having been restored in correspondence to complete the mode of operation under the above assumed conditions of the entrance of a fourth car into the weighing section 20.

*Counting cars out*

It has been pointed out that when cars leave the weighing section 20, their axles are counted in substantially the same manner as has been described with respect to counting the axles of the cars entering the weighing section 20, and in order to maintain the car counts set up in the car counter in correspondence with the cars remaining in the weighing section 20, it is necessary to subtract a car count by actuation of proper relays A–S and A–SP of the car counter each time that a car is determined as being fully out of the weighing section 20 by the exit counter. It is therefore provided, in accordance with the principles of operation of the exit counter, that if a four axle car is being counted out, the car is determined as being fully out of the weighing section 20 in accordance with the dropping away of relay 4XV (see Fig. 2C), provided that relay 6XTP is in its dropped away position. If the car that is being counted out, however, is a six axle car, it is determined as being fully out of the weighing section 20 by requiring the relays 2XV and 4XV to both be in their dropped away positions.

Rather than control the relays of the car counter directly from contact selections of the exit axle counter relays, the exit axle counter relays are made to control a substract relay S, which in turn is made to act upon the car counter relays. One reason for this organization is to provide a means to prevent interference that might exist under conditions where cars would respectively enter and leave the weighing section 20 at substantially the same time. It has thus been provided by the use of the subtract relay S (see Fig. 2B) that a car count can be subtracted from the car count that is set up in the car counter, only provided that the entrance axle counter is in a condition other than that which is established at the instant the axle counting of a car entering the weighing section 20 has been completed. In other words, in case of cars simultaneously entering and leaving the weighing section 20, the count of the car entering the weighing section 20 is first applied to the car counter, and then the subtract count is applied when relay S is permitted to be energized.

To consider a specific operating condition, it will be assumed that upon the passage of a single car, the relays 1A–S and 1A–SP of the car counter have been picked up as has been heretofore described, and it will be assumed that the car has left the weighing section 20 so as to cause an input to be applied for subtraction of the car count from the car counter. If this has been a four axle car, the subtract relay S becomes picked up upon the dropping away of relay 4XV (see Fig. 2A) by the energization of a circuit extending from (+), including back contact 118 of relay 6NTP, front contact 119 of relay 4NV, wire 120, back contact 121 of relay 4XV, back contact 122 of relay 6XTP, wire 123, front contact 124 of relay RS, and winding of relay S, to (—). In case the entrance axle counter is active at this time for counting the axles of a six axle car, the circuit for the energization of relay S is closed through front contact 118 (see Fig. 2A) of relay 6NTP and either front contact 125 of relay 2NV or front contact 126 of relay 4NV. If it is a six axle car that has just been counted out, the circuit for the energization of relay S extends through back contact 127 (see Fig. 2C) of relay 2XV, rather than through back contact 122 of relay 6XTP. Relay S (see Fig. 2B), when picked up, is maintained energized, irrespective of the entrance axle counter completing its count, by a stick circuit extending from (+), including front contact 128 of relay S, wire 120, back contact 121 of relay 4XV, back contact 122 of relay 6XTP (or back contact 127 of relay 2XV if a six axle car), wire 123, front contact 124 of relay RS, and windling of relay S, to (—).

Assuming that it is a count of one that has been previously set up in the car counter that is to be cancelled by the car leaving, the relay 1A–S becomes energized upon the picking up of relay S with a polarity neutralizing the flux in that relay so as to cause that relay to be actuated to its dropped away position. The circuit that is closed for relay 1A–S extends from (+), including back contact 129 of relay 4XV (see Fig. 2C), back contact 130 of relay 6XTP (or back contact 131 of relay 2XV, if a six axle car), wire 132, front contact 78 of relay S, front contact 79 of relay 1A–SP, front contact 104 of relay 1A–S, and lower winding of relay 1A–S, to (—). The dropping away of relay 1A–S deenergized the reset relay RS by the opening of front contact 80, and the dropping away of relay RS closes a stick circuit for relay S to insure that the relay S is maintained picked up until the resetting of the exit axle counter has become effective. This stick circuit extends from (+), including back contact 133 of relay RS, front contact 134 of relay S, and winding of relay S, to (—). Relay S is made slightly slow acting by the shunting of its windin_ by the resistor 135 to ensure this relay being maintained picked up during the crossover time of the contacts of relay RS, wherein the first described stick circuit for relay S is opened at front contact 124 of relay RS, and the last described stick circuit takes effect in accordance with the closure of back contact 133.

The resetting of the relays XV of the exit axle counter is accomplished upon the dropping away of relay RS in a manner comparable to that described in detail with reference to the relays NV of the entrance axle counter, reset being accomplished by the application of energy to the wires 49, 50, and 51 by back contacts 84, 88, and 86 of relay RS respectively, selected through front contacts 85, 89, and 87 of relay S, respectively. Thus the position of relay S determines as to whether the resetting is for the exit axle counter.

Upon the relays XV being reset to their normally energized conditions, a circuit is closed for the energization of the relay 1A–SP with a polarity to cause that relay to be dropped away. This circuit extends from (+), including front contacts 136, 137, 138, and 139 of relays 4XV, 3XV, 2XV, and 1XV, respectively (see Fig. 2C), back contact 140 of relay 6XTP, wire 141, front contact 96 of relay S, back contact 97 of relay RS, back contact 98 of relay 1A–S, front contact 108 of relay 1A–SP, and lower winding of relay 1A–SP, to (—). Relay 1A–SP becomes dropped away because of its flux, and the dropping away of this relay opens its circuits at front contacts 108 and 100 respectively. Upon the dropping away of relay 1A–SP, a pickup circuit is closed for the reset relay RS through back contacts 80 and 81 of relays 1A–S and 1A–SP, and the picking up of relay RS, in turn, causes the dropping away of relay S by opening its stick circuit at back contacts 133. It will be noted that the pickup circuit for the relay S has already been opened by the resetting of the exit axle counted relays XV. This completes restoration of the car counter to its normal condition, with no counts stored therein.

To consider another condition of a car leaving the weighing section 20, it will be assumed that a car leaves at a time when the count of two cars is set up in the car counter. This count of two has been described as being effective to cause the relays 2A–S and 2A–SP to be picked up and the relays 1A–S and 1A–SP to be in their dropped away positions. The picking up of relay S to subtract a count from the count of two that has thus been stored causes the picking up of the relays 1A–S and 1A–SP and the dropping away of relays 2A–S and 2A–SP in accordance with the energization of the circuits about to be described.

The relay 1A–S is picked up by the energization of a circuit extending from (+), including back contact 129 of relay 4XV, back contact 130 of relay 6XTP (or back contact 131 of relay 2XV), wire 132, front contact 78 of relay S, back contact 79 of relay 1A–SP, and center winding of relay 1A–S, to (−). Upon the picking up of relay 1A–S, a circuit is closed to provide neutralizing energization of relay 2A–S so as to cause that relay to be dropped away. This circuit extends from (+), including front contact 142 of relay S, back contact 143 of relay 1A–SP, front contact 111 of relay 1A–S, front contact 112 of relay 2A–SP, front contact 116 of relay 2A–S, and lower winding of relay 2A–S, to (−).

Relay RS is dropped away to effect the resetting of the exit axle counter relays XV by the same mode of operation as has been described, and after the exit axle counter relays XV have been reset, the relay 1A–SP becomes picked up, and the relay 2A–SP becomes dropped away. The pickup circuit for the relay 1A–SP extends from (+), including front contacts 136, 137, 138, and 139 of relays 4XV, 3XV, 2XV, and 1XV, respectively, back contact 140 of relay 6XTP, wire 141, front contact 96 of relay S, back contact 97 of relay RS, front contact 98 of relay 1A–S, and center winding of relay 1A–SP, to (−). Energy from this same circuit is applied through back contact 97 of relay RS, back contact 113 of relay 2A–S, and front contact 117 of relay 2A–SP to energize the lower winding of relay 2A–SP with a polarity to neutralize the flux of the relay. This completes the mode of operation required to subtract a car count from a stored count of two of the car counter.

For consideration of subtraction of a car count from a stored count of three, it will be assumed that the relays A–S and A–SP of the car counter are all picked up as required for storing a count of three, and it will be assumed that the relay S is picked up to subtract a count and thus leave a stored count of two as indicated by the relays 2A–S and 2A–SP being picked up with the relays 1A–S and 1A–SP being in their dropped away positions.

Thus with all relays of the car counter picked up, upon the picking up of relay S, the relay 1A–S becomes energized with a polarity to cause the dropping away of that relay by a circuit extending from (+), including back contact 129 of relay 4XV, back contact 130 of relay 6XTP (or back contact 131 if a six axle car), wire 132, front contact 78 of relay S, front contact 79 of relay 1A–SP, front contact 104 of relay 1A–S, and lower winding of relay 1A–S, to (−).

The dropping away of relay 1A–S deenergizes the reset relay RS by the opening of front contact 80, and upon the dropping away of relay RS, the exit counter has its relays reset and thus conditions a circuit for the neutralization of the flux of the relay 1A–SP. The neutralization of the flux of relay 1A–SP is accomplished by the energization of the lower winding of that relay by a circuit extending from (+) including front contacts 136, 137, 138, and 139 of relays 4XV, 3XV, 2XV, and 1XV, respectively (see Fig. 2C), back contact 140 of relay 6XTP, wire 141, front contact 96 of relay S, back contact 97 of relay RS, back contact 98 of relay 1A–S, front contact 108 of relay 1A–SP, and lower winding of relay 1A–SP, to (−). It will be noted that although energy when applied to this circuit is also applied to the center winding of relay 2A–SP, the relay 2A–SP is not actuated, but is maintained in its picked up position. This is because the energization of the center winding of relay 2A–SP is selected by reason of front contact 113 of relay 2A–S being closed. It will be noted that the relay 2A–S is not actuated in accordance with the dropping away of the relay 1A–S because the particular operation being considered is for a subtract count, and the actuation of the relay 2A–S for subtracting is dependent upon the picking up of the relay 1A–S for the first stage, rather than upon the dropping away of this relay as is the case for adding car counts. In other words, for adding, the second stage is actuated only in response to the dropping away of the relay 1A–S of the first stage, while for subtracting, the second stage relay 2A–S is actuated only in response to the picking up of the relay 1A–S of the first stage.

Upon the dropping away of the relay 1A–SP to complete the subtracting of a car count as described above, the reset relay RS is again energized, and the picking up of this relay opens the stick circuit at back contact 133 that has been effective to hold the subtract relay S picked up, and the subtract relay S becomes dropped away because its pickup circuit has been opened by the resetting of the relays XV of the exit axle counter.

To consider another condition of subtraction of a car count, it will be assumed that four cars have been counted into the counter, and thus the relays of the car counter are all in their dropped away positions. If at this time, a car is counted out by the relays XV of the exit axle counter, the subtract relay S becomes picked up and the relay 1A–S becomes picked up by the energization of a circuit that has been described. Upon the picking up of this relay, a pickup circuit is closed for the relay 2A–S of the second stage of the car counter, extending from (+), including front contact 142 of relay S, back contact 143 of relay 1A–SP, front contact 111 of relay 1A–S, back contact 112 of relay 2A–SP, and center winding of relay 2A–S, to (−).

In accordance with the relays 1A–S and 2A–S being both picked up, upon the resetting of the relays XV of the exit axle counter, the relays 1A–SP and 2A–SP become picked up by the energization of respective circuits for these relays that have been described. Upon the picking up of relay 1A–SP, a pickup circuit is closed for the reset relay RS, and the picking up of that relay causes the dropping away of the subtract relay S to complete the subtraction operation that has been described. The relays 1A–S and 2A–S when simultaneously energized as has been described, is indicative of a count of three, and thus the subtraction of a count of one from a count of four has been properly accomplished. Having thus described how the subtraction of one car count can be made from a storage in the car counter of any count from one to four, it should be readily apparent as to the progressive mode of operation in reducing the count stored in the car counter all the way from four to zero.

*Weighing timing*

In accordance with an object of the invention as heretofore stated of requiring a car to be fully and solely on the weighing section 20 for a predetermined length of time (such as three seconds) before permitting the actuation of the weight recorder, the relay TE (see Fig. 2C) is so controlled as to initiate its drop away timing only provided that one and only one car count is set up in the car counter, and only provided that the entrance and exit axle counters are both in their normal conditions, with no axle counts set up therein. These requisites with respect to the car counter are fulfilled by the back contact 53 of relay 1A–S (see Fig. 2B) in combination with the front contact 145 of relay 2A–S applying energy to wire 146, one or the other of these contacts being closed for any count, including zero, other than a count of one.

The wire 146 which is connected directly to the winding of the timing relay TE also has energy applied thereto by the closure of either of the back contacts 147, 148, 149, or 150 of relays 1NV, 2NV, 3NV, and 4NV respectively (see Fig. 2A) of the entrance axle counter so that any count of the entrance axle counter applies energy to the timing relay TE to prevent the fulfillment of a timing interval under conditions where a car is only partly entered into the weighing section 20. Similarly, either of the back contacts 151, 152, 153, or 154 of relays 1XV, 2XV, 3XV, and 4XV (see Fig. 2C) is effective to apply energy to the winding of the timing relay TE to prevent the fulfillment of timing under conditions where a car has only partially left the weighing section 20. In this way, the timing relay TE is properly controlled to be dropped away when and only when one car has been fully in the weighing section 20 for the predetermined weighing time interval of approximately three seconds. If another car enters the weighing section 20 so as to start to actuate the entrance axle counter, or if the car in the weighing section starts to leave before the timing is complete, the recording of the weight is prevented. At the end of the timing interval, the dropping away of the relay TE applies energy to the actuating mechanism of the weight recorder through back contacts 155 to record the weight of the car on a card, or other suitable record paper that may be inserted in the weight recorder by an operator, the weight setting of the recorder having been determined by the weighing mechanism in response to the weight of the car in the weighing section 20.

For the purpose of indicating when a timing as has been described is taking place, the audible indicating device BX (see Fig. 2C) is sounded during the interval in which relay TE is deenergized, but has not yet been dropped away to actuate the weight recorder. Such an indication may be desirable to indicate to the operator that he must insert his weight card in the recorder. The circuit for the energization of the buzzer BX extends from (+), including front contacts 147, 148, 149, and 150 of relays 1NV, 2NV, 3NV, and 4NV respectively (see Fig. 2A), wire 156, front contact 157 of relay 1A–S, back contact 158 of relay 2A–S, wire 159, front contacts 160, 161, 162, and 163 of relays 1XV, 2XV, 3XV, and 4XV respectively, winding of buzzer BX, and front contact 164 of relay TE, to (—). Also by substantially the same circuit, but including front contact 165 of relay TE, the timer indicating lamp TK (see Fig. 2C) is energized as a visual indication that the timing interval is being measured.

As an indication of the normal conditions of all three counters, the counting lamp CK (see Fig. 2C) is provided with a circuit that is closed when a count is set up by any one of the three counters, but is opened when all three counters are in their normal conditions. Thus the lamp CK is normally dark, but it is energized upon the closure of any one of the back contacts 166, 167, 168, and 169 of relays 1NV, 2NV, 3NV, and 4NV respectively (see Fig. 2C) applying energy to wire 170. An indication of the car counter being in a condition other than normal is provided by the application of energy to wire 170 by any one of front contacts 171, 172, 173, and 174 of relays 1A–SP, 1A–S, 2A–S and 2A–SP respectively (see Fig. 2B). If the exit axle counter is in a condition other than normal, energy is applied to the wire 170 for the energization of the lamp CK through any one of the back contacts 175, 176, 177, and 178 of relays 1XV, 2XV, 3XV, and 4XV respectively (see Fig. 2C).

From the typical conditions of operation of the system that have been described, it should be readily apparent as to the mode of operation and conditions involving other operations as they may be required, and it should be readily apparent to those skilled in the art how the system may be modified as required to satisfy varying requirements of practice. One feature of the system that will be apparent from the mode of operation as it has been described is that although the prevailing direction of traffic is assumed to be as indicated by the arrow 27 of Fig. 1, if cars are run over the weighing section 20 in the opposite direction, they are counted into the weighing section 20 by what has been described as the exit axle counter, and are counted out of the weighing section 20 by what has been described as the entrance axle counter. By this reverse mode of operation, the feeding of counts into the car counter by the relays XV is effective to add car counts, and the subtraction of car counters is accomplished in response to the output of the axle counter having relays NV. This reversal of the mode of operation is accomplished with no change in circuits, or by requiring the operation of no selector switches or the like, but rather is inherent in the organization. It is believed that it should be unnecessary to describe the specific circuit organization to provide this mode of operation, because such organization has already been described, but a consideration of the principles of operation as they have been set forth will make it readily apparent that this reverse mode of operation is effective. Thus, for example, if it is assumed that under normal conditions of the system, with no count set up in any of the counters, a car is run through the weighing section 20 in a direction opposite from the prevailing direction, when the car is counted into the weighing section 20, the subtract relay S is picked up, and by reason of subtracting a car count from the zero count (which corresponds to a count of four, see Fig. 3), the relays of the car counter are conditioned for a count of three (all four relays up). As the car progresses through the weighing section 20 in the opposite direction, and is counted out by the relays NV, the feeding of an add count to the car counter adds a count of one to a count of three that has been set up, and thus results in the setting up of a count of four, which is with all car counter relays down, and corresponds to the normal conditions of the system, thus completing the restoration to normal of the parts of the system subsequent to the passage of a single car in reverse direction through the weighing section 20.

Not only does this condition relative to mode of operation for reverse car movements automatically restore itself after the passage of but one car, but the automatic restoration is effective for any number of cars going through the weighing section 20 in the reverse direction. That is, if any number of cars up to the capacity of four is counted into the car counter by the reverse direction of operation, before any car leaves, these four cars are respectively counted out so that when the fourth car leaves the weighing section 20, the car counter is restored to its normal conditions with all of its relays in their dropped away positions, without any manipulation being required on the part of an operator.

The only condition that should require the actuation of the reset push button PB by an operator is when power is applied to the system, and under a condition where a car may enter weighing section 20 from either direction and then be backed out. Such an abnormal operation would of course leave a count set up in one or more of the counters because the car had not progressed fully through the weighing section 20, and the actuation of the reset push button PB by an operator would be required to restore the condition of the system to normal after the weighing section 20 had been vacated by the car being backed out of the weighing section 20.

Having described a specific system of weight recording for moving railway cars as one embodiment of the present invention, it is to be understood that the present invention is not limited to the specific form shown, and that various adaptations, alterations, and modifications may be applied to the specific form shown to merit the requirements of practice, except as limited by the scope of the appending claims.

It will be noted that the means provided for the control of the respective six axle car detector relays 6NTP and 6XTP is so organized that each of these relays can be picked up only before the first count is made in counting the axles of a car by the associated axle counter. This arrangement provides that even though the treadles 6NT and NT, for example, should be simultaneously operated by respective axles of adjoining cars, the relay 6NTP would not be picked up because of the relays of the entrance axle counter being in a condition other than normal. That is, as soon as any count is taken by the entrance axle counter relays, the pickup circuit for relay 6NTP through front contacts 90, 91, 92, and 93 of relays 4NV, 3NV, 2NV, and 1NV respectively is opened, and thus the relay 6NTP could not be picked up by any combination of axles of adjoining cars actuating the treadles 6NT and NT simultaneously. A similar condition exists with respect to the control of the relay 6XTP which is associated with the exit axle counter.

What we claim is:

1. A weight recording system for weighing moving railway cars comprising in combination, a stretch of railway track including a weighing section having respective entrance and exit ends and having associated therewith a weighing mechanism, detector means at the respective entrance and exit ends of said weighing section for determining when a car at the associated end of the weighing section has respectively fully entered or fully left said section, an add-subtract car counter with a capacity for counting a plurality of cars, circuit means for causing said car counter to add a count in response to said detector means at the entrance end of said section, circuit means for causing said car counter to subtract a count in response to said detector means at the exit end of said section, a weight recorder responsive in its weight settings to said weighing mechanism, said weight recorder being operable when rendered effective to record the weight indicated by the condition of said weighing mechanism, a normally inactive timer for rendering said recorder effective to record the weight of a car at the end of a predetermined interval initiated by the rendering active of said timer, circuit means governed by said car counter for rendering said timer active only when a single count has been counted by said car counter, said timer being rendered inactive whenever said car counter registers a count of more than one car.

2. A weight recording system for weighing moving railway cars comprising in combination, a stretch of railway track including a weighing section having respective entrance and exit ends for a given direction of traffic, a weighing mechanism actuated in accordance with the weight of a car occupying said weighing section, detector means for the respective entrance and exit ends of said weighing section for determining when a car at the associated end of said section has respectively fully entered or fully left said section, a car counting relay bank operable to distinctive conditions for each of several successive counts, circuit means for causing said counting relay bank to add a count each time a car is detected by said detector means as having fully entered said section, circuit means for causing said counting bank to subtract a count each time a car is detected by said detector means as having fully left said weighing section, a weight recorder operable in its weight setting in response to said weighing mechanism and operable when rendered effective to record the weight according to its setting, a timer effective when initiated to render said recorder effective to record the weight of a car at the end of a predetermined interval, and means governed by said car counter for initiating said timer only when a single car count has been counted by said car counter, said timer being rendered inactive provided said car counter registers a count of more than one car.

3. A weight recording system for recording the weight of moving railway cars comprising in combination, a stretch of railway track including a weighing section having respective entrance and exit ends for a given direction of traffic, a weighing mechanism actuated in accordance with the weight of a car occupying said weighing section, detector means associated with the respective entrance and exit ends of said weighing section effective to determine when a car at the associated end has respectively fully entered or fully left said section, a car counting relay bank operable to distinctive conditions for each of several successive counts, circuit means for causing said counting relay bank to add a count each time a car is detected by said detector means associated with the entrance end of said weighing section as having fully entered said weighing section, circuit means for causing said counting relay bank to subtract a count each time a car is detected by said detector means associated with the exit end of said weighing section as having fully left said weighing section, a weight recorder operable in its weight setting in response to said weighing mechanism and operable when rendered effective to record the weight according to its setting, a timer effective when initiated to render said recorder effective to record the weight of a car at the end of a predetermined time interval, means for initiating said timer only when said car counter registers a particular count indicative of there being but a single car on said weighing section, said timer being rendered inactive whenever said car counter registers a count of more than one car, an audible indication device, means for rendering said audible indication device active for the duration of said predetermined time interval.

4. A weight recording system for recording the weight of moving railway cars comprising in combination, a stretch of railway track including a weighing section, said weighing section having respective entrance and exit ends for a given direction of traffic, a weighing mechanism actuated in accordance with the weight of a car occupying said weighing section, detector means associated with the entrance end of said weighing section for determining when a car has fully entered said section, detector means associated with the exit end of said weighing section for determining when a car has fully left said weighing section, a car counter operable to distinctive conditions for each of several successive counts, circuit means for causing said car counter to add a count each time a car is detected by said entrance detector means, circuit means for causing said car counter to subtract a count each time a car is detected as having left said weighing section by said exit detector means, a weight recorder operable in its setting in response to said weighing mechanism and operable when rendered effective to record the weight according to its setting, a normally inactive timer for rendering said weight recorder effective at the end of a predetermined time interval to record its weight setting, means for rendering said timer active to initiate said timing interval only when said car counter registers a particular predetermined count indicative of there being but a single car fully on said weighing section, said timer being rendered inactive provided said car counter registers a count of more than one car, an indicator lamp, and means for energizing said indicator lamp during said predetermined time interval.

5. A system for recording the weight of moving railway cars comprising in combination, a stretch of railway track including a weighing section having respective entrance and exit ends for a given direction of traffic, a weighing mechanism actuated in accordance with the weight of a car occupying said weighing section, entrance detector means associated with the entrance end of said weighing section for determining when each car enters the weighing section, exit detector means associated with the exit end of said weighing section for determining when each car leaves the weighing section, a car counter operable to distinctive conditions for each of several successive counts, circuit means for causing said counter to add a count each time a car is detected by said entrance detector means as having entered said weighing section and for causing said car counter to subtract a count each time a car is detected by said exit detector means as having left said weighing section, a weight recorder operable in its weight setting in response to said weighing mechanism and operable when rendered effective to record the weight according to its setting, a timer effective when initiated to render said recorder effective to record the weight of a car at the end of a predetermined time interval, means governed by said car counter for initiating said timer only when a single car is fully on said weighing section, said timer being rendered inactive provided said car counter registers a count of more than one car, an audible indication device, means for rendering said audible device effective during said predetermined interval, an indicator lamp, and means for energizing said indicator lamp during said predetermined interval.

6. A system for recording the weight of moving railway cars comprising in combination, a stretch of railway track including a weighing section having entrance and exit ends for a given direction of traffic, a weighing mechanism actuated in accordance with the weight of a car occupying said weighing section, detector means associated with the respective entrance and exit ends of said weighing section for determining when a car at the associated end has respectively fully entered or fully left said section, a car counter operable to distinctive conditions for each of several successive counts, circuit means for causing said car counter to add a count in response to a car being detected by said detector means as having fully entered said detector section, said circuit means being effective to subtract a count each time a car is detected by said detector means as having fully left said weighing section, a weight recorder operable in its settings in response to said weighing mechanism and operable to record the weight according to its weight setting when rendered effective, a timer for rendering said recorder effective to record the weight of the car at the end of a predetermined time interval, means governed by said counter for initiating said timer into the timing of said interval only when a single car is fully on said weighing section, said timer being rendered inactive whenever said car counter registers a count of more than one car, means including said detector means for preventing the recording of the weight of a car in case that car starts to leave said weighing section while said timer is active, but before the end of said predetermined interval.

7. A system for recording the weight of moving railway cars comprising in combination, a stretch of railway track including a weighing section having entrance and exit ends for a given direction of traffic, a weighing mechanism actuated in accordance with the weight of a car occupying said weighing section, detector means associated with the respective entrance and exit ends of said weighing section for determining when cars respectively fully enter and fully leave said weighing section, a car counter operable to distinctive conditions for each of several successive car counts, circuit means for causing said counter to add a count for each car that is detected as having fully entered said weighing section and to subtract a count for each car that has fully left said weighing section, a weight recorder having its settings determined by said weight mechanism and effective to record the weight when rendered active, a normally inactive timer for rendering said recorder active to record the weight of a car at the end of a predetermined interval initiated by rendering said timer active, means governed by said car counter for rendering said timer active only when a single car is fully on said weighing section, said timer being rendered inactive provided said car counter registers a count of more than one car, means including said detector means for preventing the recording of the weight of a first car in case a second car enters said weighing section while said timer is active but before the end of said predetermined time interval, and means including said detector means for preventing the recording of the weight of a car in case the car starts to leave said weighing section while said timer is active but before the end of said predetermined interval.

8. A system for recording the weight of moving railway cars comprising in combination, a stretch of railway track including car weighing scales, car wheel operable treadles disposed at the respective entrance and exit ends of the scales, respective entrance and exit axle counters associated with the treadles at the respective entrance and exit ends of the scales, said axle counters having a normal zero count condition, each of said counters being actuated for a single count in response to each actuation of the associated treadle, an add-subtract car counter with a capacity for counting a plurality of cars, circuit means for causing said car counter to add a count in response to the counting of all axles of a car by said entrance axle counter, circuit means for causing said car counter to subtract a count in response to the counting of all axles of a car by said exit axle counter, re-set means for each of the axle counters for automatically restoring that counter to its normal condition in response to the axle counter having caused the registration of a car count in said car counter, a weight recorder responsive in its weight settings to said scales, said weight recorder being operable when rendered effective to record the weight indicated by said scales, and a timer for rendering said recorder effective to record the weight of a car at the end of a predetermined time interval, said interval being initiated when and only when said car counter registers a count of one car and said axle counters are in their respective normal conditions.

9. A system for recording weights of moving vehicles wherein the vehicles have different numbers of axles comprising, a weighing device disposed in the path of said moving vehicles, axle counting means for each end of said weighing device for counting said axles of said vehicles as said vehicles respectively enter and leave said weighing device, vehicle identification means associated with each of said counting means being selectively controlled according to the number of axles of each vehicle respectively leaving and entering said weighing device, circuit means associated with each of said axle counting means and responsive to the controlled condition of said vehicle identification means for causing the associated axle counting means to supply a distinctive output only when all of the axles of a vehicle have been counted, car counting means responsive to said distinctive outputs from said axle counting means to give a count of the number of said vehicles on said weighing device at each instant, weight recording means responsive to said vehicle counting means for recording the weight upon said weighing means only when a predetermined number of vehicles is wholly on said weighing means.

10. A system for recording weights of individual moving vehicles comprising, a weighing device disposed in the path of said vehicles, axle counting means at each end of said weighing device for detecting the entrance and exit from said weighing device of said vehicles, vehicle counting means having a capacity to count a plurality of cars and being responsive only to each of said axle counting means for determining the number of said vehicles on said weighing device, weight recording means responsive to said vehicle counting means for recording the weight upon said weighing device only when a predetermined number of vehicles is wholly on said weighing means.

11. A system for recording the weight of moving railway cars comprising in combination, a stretch of railway track including a weighing section having respective entrance and exit ends for a particular direction of traffic, a weighing mechanism actuated in accordance with the weight of a car occupying said weighing section, entrance and exit wheel actuated contactors at the respective entrance and exit ends of said section, entrance and exit axle counters actuated respectively in response to the actuation of said entrance and exit contactors, a car counter operable to distinctive conditions for each of several successive car counts, circuit means for causing said car counter to add a count for each car that has had all of its axles counted by said entrance axle counter, circuit means for causing said car counter to subtract a count for each car that has had all of its axles counted by said exit axle counter, a weight recorder having its weight setting determined by said weighing mechanism and effective when rendered active to record the weight according to its setting, a normally inactive timer for rendering said recorder active to record the weight of a car at the end of a predetermined interval initiated by rendering said timer active, and means governed by said car counter for rendering said timer active only provided a single car is fully on said weighing section, said timer being rendered inactive whenever said car counter registers a count of more than one car.

12. A system for recording the weight of moving railway cars comprising in combination a weighing section in a stretch of railway track having entrance and exit ends for a given direction of traffic, entrance and exit wheel actuated contactors at the respective entrance and exit ends of said section, entrance and exit axle counters actuated respectively in response to the actuation of said entrance and exit contactors, a car counter operable to distinctive conditions for each of several successive car counts, circuit means for rendering said car counter effective to add a car count for each car that has had all of its axles counted by said entrance axle counter, circuit means for rendering said car counter effective to subtract a count for each car that has had all of its axles counted by said exit counter, a weight recorder having its weight settings determined by said weighing mechanism and effective when rendered active to record the weight according to its setting, a timer for rendering said recorder active to record the weight of a car at the end of a predetermined interval initiated by said timer being rendered active, means governed by said car counter for rendering said timer active only provided a single car is fully on said weighing section, said timer being rendered inactive provided said car counter registers a count of more than one car, and means including said entrance and exit axle counters for preventing the recording by said recorder in case either said entrance or exit axle counters is actuated for a count of less than a full complement of car axles.

13. A system for recording the weight of moving railway cars comprising in combination, a weighing section having respective entrance and exit ends for a particular direction of traffic, a weighing mechanism actuated in accordance with the weight of a car occupying said weighing section, entrance and exit wheel actuated contactors at the respective entrance and exit ends of said section, an entrance axle counter relay bank actuated in response to the actuation of said entrance contactor, an exit axle counter relay bank actuated in response to the actuation of said exit contactor, a car counting relay bank operable to distinctive conditions for each of several successive car counts, circuit means for causing said car counter to add a count for each car that has had all of its axles counted by said entrance axle counter, circuit means for causing said car counter to subtract a count for each car that has had all of its axles counted by said exit axle counter, a weight recorder having its weight settings determined by said weighing mechanism and effective when rendered active to record the weight according to its setting, a timer for rendering said recorder active a predetermined timer interval after its initiation, means governed by said car counter for initiating said timer only when a single car is fully on said weighing section, said timer being rendered inactive whenever said car counter has counted more than one car onto said scale, and means for preventing said timer from rendering said weight recorder active when any relays of said entrance or said exit axle relay counter are actuated in response to the associated contactor.

14. A system for recording the weight of moving railway cars comprising in combination, a stretch of railway track including a weighing section having respective entrance and exit ends for a particular direction of traffic, a weighing mechanism actuated in accordance with the weight of a car occupying said weighing section, entrance and exit wheel actuated contactors at the respective entrance and exit ends of said weighing section, a six axle car detector for each end of said weighing section having a wheel actuated contactor a fixed distance equal to the spacing of the front and rear axles of a three axle car truck in approach of the respective entrance and exit contactors, whereby said six axle detector is actuated only in response to six axle cars, entrance and exit axle counters actuated respectively in response to the actuation of said entrance and exit contactors, a car counter operable to distinctive conditions for each of several successive car counts, entrance axle counter output circuit means for causing said car counter to add a count for each time said entrance axle counter counts six provided the associated six axle car detector is actuated, said entrance axle counter output circuit means being effective for causing said car counter to add a count each time said entrance axle counter counts four provided the associated six axle car detector is not actuated, exit axle counter output circuit means for causing said car counter to subtract a count for each time said exit axle counter counts six provided the associated six axle car detector is actuated, said exit axle counter output circuit means being effective for causing said car counter to subtract a count each time said exit axle counter counts four provided the associated six axle car counter is not actuated, a weight recorder having its weight settings determined by said weighing mechanism and effective when rendered active to record the weight according to its setting, a timer for rendering said recorder active to record the weight of a car at the end of a predetermined interval initiated by said timer being rendered active, means for rendering said timer active only provided a count of one is set up by said car counter, and means including said entrance and exit axle counters for preventing the recording by said recorder in case either said entrance or exit axle counters is actuated for a count of less than a full complement of car axles.

15. A system for recording the weight of moving railway cars comprising in combination, a weighing section in a stretch of railway track having respective entrance and exit ends for a given direction of traffic, a weighing mechanism actuated in accordance with the weight of a car occupying said weighing section, entrance and exit wheel actuated contactors at the respective entrance and exit ends of said weighing section, a six axle car detector for each end of said weighing section having a wheel actuated contactor a fixed distance equal to the spacing of the front and rear axles of a three axle car truck in approach of the entrance or exit contactor at the associated end, whereby said six axle detector is actuated only in response to the passage of six axle cars, entrance and exit axle counters actuated respectively in response to the actuation of said entrance and exit contactors, a car counter operable to distinctive conditions for each of several successive car counts, entrance axle counter output circuit means for causing said car counter to add a count each time said entrance axle counter counts six if the associated six axle car detector is actuated, said entrance axle car output circuit means being effective to cause said car counter to add a count each time said entrance axle counter counts four if the associated six axle car detector is not actuated, exit axle counter output circuit means for causing said car counter to subtract a count each time said exit axle counter counts six if the associated six axle car detector is actuated, said exit axle counter output circuit means being effective for causing said car counter to subtract a count each time said exit axle counter counts four if the associated six axle car detector is not actuated, re-set means rendered effective in response to a change in the condition of said car counter to re-set the particular axle counter whose output has been responsible for such change, a weight recorder having its weight settings determined by said weighing mechanism and effective when rendered active to record the weight according to its setting, a timer for rendering said recorder active to record the weight of a car at the end of a predetermined interval initiated by said timer being rendered active, and means for rendering said timer active only provided a count of one is set up by said car counter.

16. A system for recording the weight of moving railway cars comprising in combination, a weighing section in a stretch of railway track having respective entrance and exit ends for a particular direction of traffic, a weighing mechanism actuated in accordance with the weight of a car occupying said weighing section, entrance and exit wheel actuated contactors at the respective entrance and exit ends of said section, entrance and exit axle counters actuated respectively in response to the actuation of said entrance and exit contactors, a car counter operable to distinctive conditions for each of several successive car counts, circuit means for causing said car counter to add a count for each car that has had all of its axles counted by said entrance axle counter, circuit means for causing said car counter to subtract a count for each car that has had all of its axles counted by said exit axle counter, said circuit means for causing said car counter to add being effective to prevent an output from said exit axle counter from being applied to the car counter while an add count is being made, a weight recorder having its weight setting determined by said weighing mechanism and effective when rendered active to record the weight according to its setting, a normally inactive timer for rendering said recorder active to record the weight of a car at the end of a predetermined interval initiated by rendering said timer active, and means for rendering said timer active only provided a count of one is set up by said car counter.

References Cited in the file of this patent
UNITED STATES PATENTS

| | | |
|---|---|---|
| 1,147,797 | Goetz | July 27, 1915 |
| 1,597,853 | Wiley | Aug. 31, 1926 |
| 2,083,783 | Haegele | June 15, 1937 |
| 2,133,760 | Williams | Oct. 18, 1938 |
| 2,189,879 | Brown | Feb. 13, 1940 |
| 2,525,824 | Nagel | Oct. 17, 1950 |
| 2,528,790 | Scherer | Nov. 7, 1950 |
| 2,678,165 | Burn | May 11, 1954 |
| 2,701,301 | Mullarkey | Feb. 1, 1955 |